United States Patent
Gomes et al.

(10) Patent No.: US 6,753,554 B1
(45) Date of Patent: Jun. 22, 2004

(54) WATER FLOW REGULATING DEVICE

(76) Inventors: Antonio Jose Gomes, 150 Langstaff Road, Richmond Hill, Ontario (CA), L4C-6N4; Dina Gomes, 150 Langstaff Road, Richmond Hill, ON (CA), L46-6N4

( * ) Notice: Subject to any disclaimer, the term of this patent is extended or adjusted under 35 U.S.C. 154(b) by 113 days.

(21) Appl. No.: 10/156,047

(22) Filed: May 28, 2002

(51) Int. Cl.[7] ............................................. F16K 31/02
(52) U.S. Cl. ................ 257/129.15; 257/289; 257/129.5; 137/801
(58) Field of Search ......................... 257/295, 129.04, 257/289, 129.15; 137/606, 801

(56) References Cited

U.S. PATENT DOCUMENTS

| | | | | |
|---|---|---|---|---|
| 3,638,680 A | * | 2/1972 | Kopp | 251/129.04 |
| 5,095,941 A | * | 3/1992 | Betz | 251/295 |
| 5,173,178 A | * | 12/1992 | Kawashima et al. | 251/129.04 |
| 5,322,084 A | * | 6/1994 | Ghiassian | 251/295 |
| 5,322,086 A | * | 6/1994 | Sullivan | 251/129.04 |
| 5,511,763 A | * | 4/1996 | Green | 251/295 |
| 5,941,504 A | * | 8/1999 | Toma et al. | 251/295 |
| 6,219,859 B1 | * | 4/2001 | Derakhshan | 251/295 |
| 6,305,663 B1 | * | 10/2001 | Miller | 251/295 |

* cited by examiner

*Primary Examiner*—John Bastianelli

(57) ABSTRACT

A water flow regulating device that connects to a faucet and allows a user to set water temperature and pressure that flows from the faucet, and then turn it off and on without having to readjust the water pressure or temperature. Control of the water flow is accomplished through a manual switch located on the faucet housing or by a variety of push switches that could be activated by the hip, elbow, knee, or foot for hands free operation.

1 Claim, 4 Drawing Sheets

WATER FLOW REGULATING DEVICE

BACKGROUND OF THE INVENTION

1. Field of the Invention

The present invention relates to a plumbing related device for use in connection with regulating the flow of water through a faucet. The water flow regulating device has particular utility in connection with providing a hands free method for permitting and prohibiting the flow of water to a faucet.

2. Description of the Prior Art

Water flow regulating devices are desirable for controlling the flow of hot or cold water to a faucet. Regulating the water flow to specific faucets allows the user to conserve potable water and the energy used to heat it. This translates to a financial savings as well as an aid to conservation of natural resources.

Most conventional faucets include one or more fluid valves that are turned on manually by the user who operates the valve control device. These devices require the user to manipulate the valve controls first with dirty hands and then again after he washes his hands. This could lead to the user picking up the same germs and dirt he just attempted to wash off as well as any dirt and germs left by previous users. The proposed water flow regulating device would allow the user a hands free method of washing his hands, eliminating the possibility of picking up extraneous material from the valve controls. Additionally, when the user engages in an activity which requires repeated pauses in the need for water flow, such as washing the dishes, washing the car, watering in the garden, and the like, it is oftentimes more convenient to leave the water running than to readjust the temperature and pressure each time the water is turned off and then on again. Thus, conventional faucets can lead to the waste of many gallons of water.

The use of water regulating devices is known in the prior art. For example, U.S. Pat. No. 3,505,692 to Norman A. Forbes discloses a proximity control for a lavatory that uses a dual antenna system to determine when a person is waiting for water flow from the faucet. However, the Forbes '692 patent does not allow the user to determine how long the water runs since water is only permitted to flow for a predetermined amount of time, and has further drawbacks of forcing the user to wait a predetermined amount of time before the water is permitted to flow again. This can be very inconvenient and time consuming for the user who requires more than the predetermined amount of time to clean his hands, a spill from his clothing, or to help clean a child's hands. Additionally, the complexity of the internal components for the Forbes '692 device complicates the manufacturing process, thereby increasing the price for the device.

U.S. Pat. No. 4,563,780 to Simcha Z. Pollack discloses an automated bathroom that comprises an electronically controlled shower, bathtub, sink, and toilet. The Pollack '780 device includes temperature sensors in all of the receptacles, water level sensors, and timers to determine the amount of time allowed for water flow. However, the Pollack '780 device is extremely complex, leading to higher manufacturing prices. Additionally, due to the complexity of the device, the Pollack '780 device would be time consuming and difficult to master for proper usage.

Similarly, U.S. Pat. No. 4,189,792 to Carlos W. Veach discloses a push button controlled water system which controls both the mixing of hot and cold water and the subsequent flow of water to the spigot. However, the Veach '792 patent does not provide for hands free operation, requiring manual operation of the "ON" and "OFF" push button controls, as well as the rotational temperature control valve.

Likewise, U.S. Pat. No. Des. 295,614 to Joseph Touch discloses the ornamental design for a water temperature and flow regulator panel. However, the Touch '614 patent provides only a panel for regulating water flow and not the actual hardware to accomplish this function.

U.S. Pat. No. 5,318,070 to Edward C. Surabian discloses an electric faucet valve operator and adapter that use push buttons to electromechanically control the rotational force necessary to manipulate a faucet. However, the Surabian '070 patent does not provide hands free operation of the device, since the buttons require that the user place his fingers on them for activation. Additionally, the Surabian '070 device is battery powered, requiring frequent replacement of batteries and increasing the cost and waste associated with such a device.

Lastly, U.S. Pat. No. Des. 313,761 to Peter W. Bressler discloses the ornamental design for an actuator plate for a temperature control valve. However, the Bressler '761 patent does not deal with the issue of water regulation and is not pertinent to the present invention.

While the above-described devices fulfill their respective, particular objectives and requirements, the aforementioned patents do not describe a water flow regulating device that allows a hands free method for permitting and prohibiting the flow of water to a faucet. The Forbes '692 patent would not be applicable for home use since it does not allow the user to determine how long the water runs, shutting off water flow after a predefined amount of time. Both the Forbes '692 and Pollack '780 devices are extremely complex, leading to higher manufacturing prices. Additionally, due to the complexity of the device, the Pollack '780 device would be time consuming and difficult to master for proper usage. Neither the Veach '792 nor the Surabian '070 patents provide hands free operation of the devices. Furthermore, the Surabian '070 device is battery powered, requiring frequent replacement of batteries and increasing the cost and waste associated with such a device. While the Touch '614 patent provides a panel for regulating water flow, it does not provide the actual hardware to accomplish this function. Finally, the Bressler '761 patent deals with the issue of temperature control and is not pertinent to the discussion of water flow regulation of the present invention.

Therefore, a need exists for a new and improved water flow regulating device that can be used to provide a hands free method for permitting and prohibiting the flow of water to a faucet. In this regard, the present invention substantially fulfills this need. In this respect, the water flow regulating device according to the present invention substantially departs from the conventional concepts and designs of the prior art, and in doing so provides an apparatus primarily developed for the purpose of conserving water by controlling the flow of water to a faucet.

SUMMARY OF THE INVENTION

In view of the foregoing disadvantages inherent in the known types of water flow regulating devices now present in the prior art, the present invention provides an improved water flow regulating device, and overcomes the above-mentioned disadvantages and drawbacks of the prior art. As such, the general purpose of the present invention, which will be described subsequently in greater detail, is to provide a new and improved water flow regulating device which has all the advantages of the prior art mentioned heretofore and many novel features that result in a water flow regulating device which is not anticipated, rendered obvious, suggested, or even implied by the prior art, either alone or in any combination thereof.

To attain this, the present invention essentially comprises a pair of solenoid valve assemblies connected to the hot and cold water pipes and a coupling device connected to the faucet. The coupling device has a control switch assembly with an "OFF" and "ON" position which prohibits or permits water flow through the solenoid valve assemblies. A set of push panel switches can be connected to the circuit and placed at various positions on the sink cabinet such that they can be accessed by the hand, hip, elbow, knee, or foot of the user.

A second embodiment of the present invention is for a faucet with a water flow regulating switch which essentially comprises a valve assembly inserted into a conventional faucet assembly which is controlled by a switch assembly on the faucet. The switch assembly has an "OFF" and "ON" position which prohibit or permit water flow through the valve assembly.

A third embodiment of the present invention essentially comprises a pair of valve assemblies connected to the hot and cold water pipes and a faucet assembly having a control switch on its external surface. The control switch has an "OFF" and "ON" position which prohibit or permit water flow through the valve assemblies. A set of push panel switches can be connected to the circuit and placed at various positions on the sink cabinet such that they can be accessed by the hand, hip, elbow, knee, or foot of the user.

There has thus been outlined, rather broadly, the more important features of the invention in order that the detailed description thereof that follows may be better understood and in order that the present contribution to the art may be better appreciated.

The invention may also include a discussion of the placement of the push panel switches and consideration of different power sources. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water flow regulating device that has all of the advantages of the prior art water flow regulating devices and none of the disadvantages.

It is another object of the present invention to provide a new and improved water flow regulating device that may be easily and efficiently manufactured and marketed.

An even further object of the present invention is to provide a new and improved water flow regulating device that has a low cost of manufacture with regard to both materials and labor, and which accordingly is then susceptible of low prices of sale to the consuming public, thereby making such water flow regulating device economically available to the buying public.

Still another object of the present invention is to provide a new water flow regulating device that provides in the apparatuses and methods of the prior art some of the advantages thereof, while simultaneously overcoming some of the disadvantages normally associated therewith.

Even still another object of the present invention is to provide a water flow regulating device for permitting and prohibiting the flow of water to a faucet. This allows the user to turn the water off and on without having to readjust the temperature and pressure each time.

Yet another object of the present invention is to provide a water flow regulating device that helps conserve potable water and the energy used to heat it. This translates to a financial savings as well as an aid to conservation of natural resources.

Lastly, it is an object of the present invention to provide a new and improved water flow regulating device that allows hands free regulation of water flow. This allows the user keep his hands and the faucet germ and dirt free and provides a more sanitary method of hand washing.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
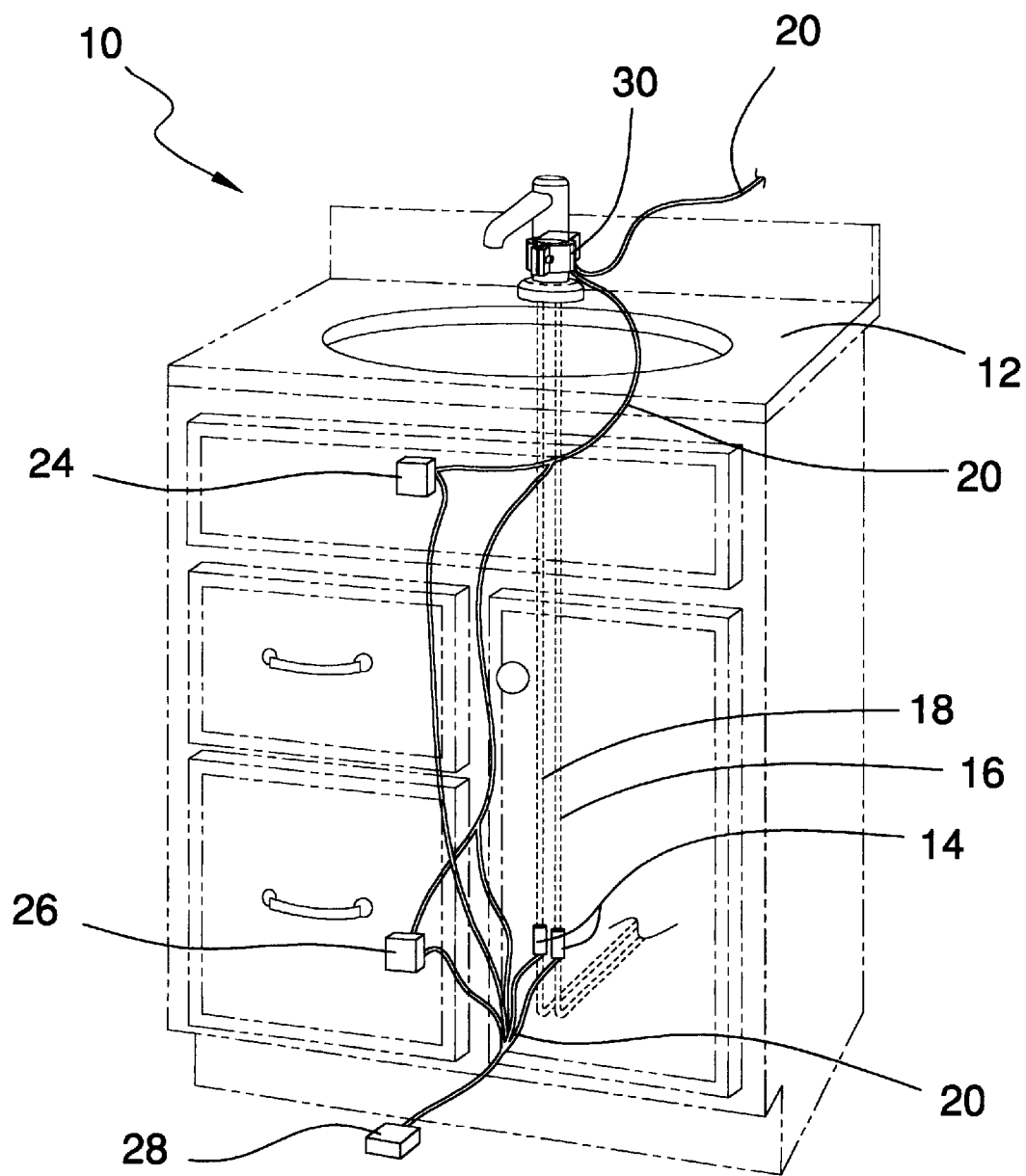
FIG. 1 is a front perspective view of the preferred embodiment of the water flow regulating device constructed in accordance with the principles of the present invention.

Referring now to the drawings, and particularly to FIGS. 1–4, a preferred embodiment of the water flow regulating device of the present invention is shown and generally designated by the reference numeral 10.

Figure 2:
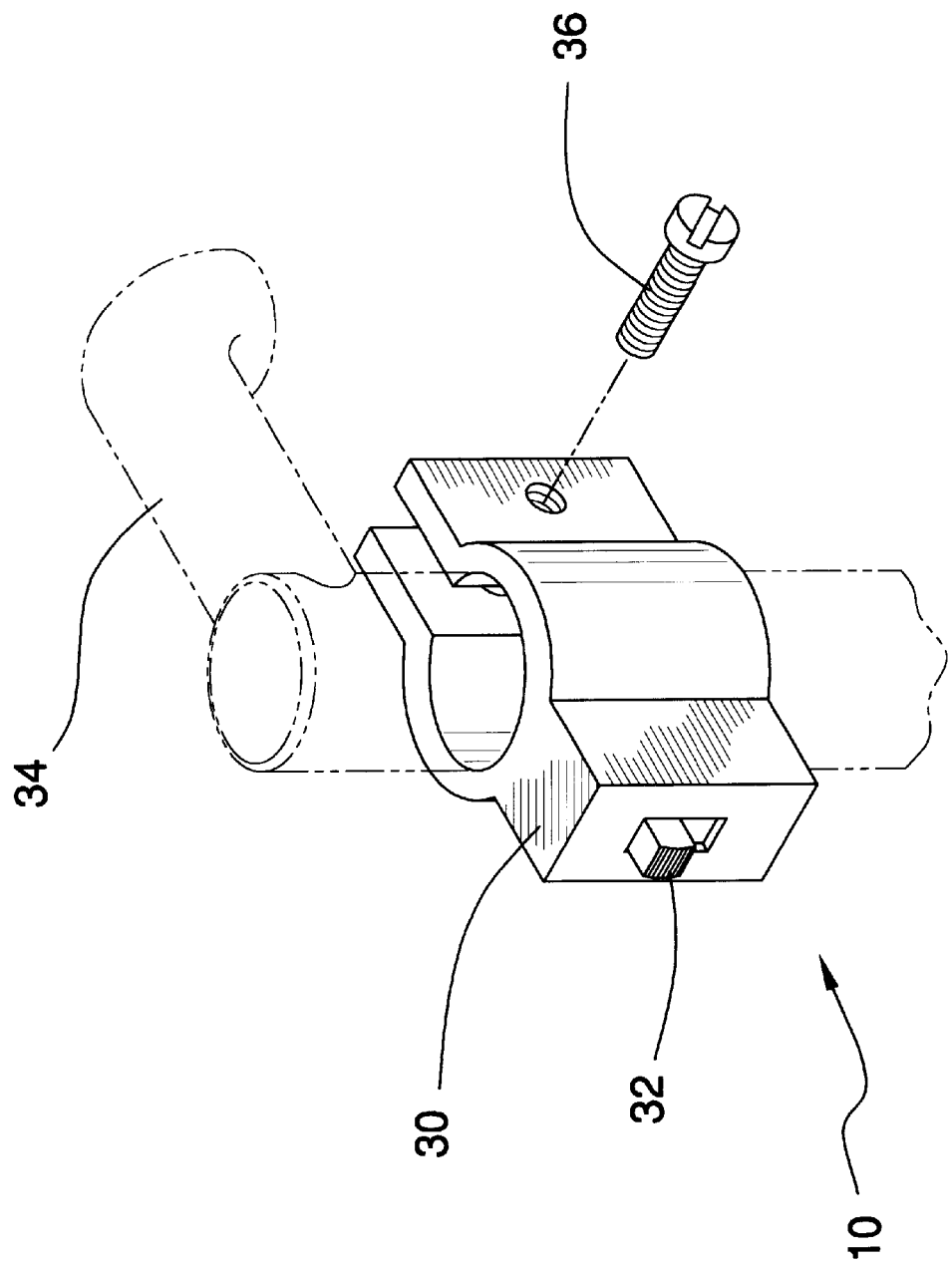
FIG. 2 is a side perspective view of the external faucet adapter embodiment of the water flow regulating device of the present invention.

In FIG. 1, a new and improved water flow regulating device 10 of the present invention for providing a hands free method for permitting and prohibiting the flow of water to a faucet is illustrated and will be described. More particularly, the water flow regulating device 10 is shown mounted in a cabinet style sink 12 such as is found in a household bathroom. The water flow regulating device 10 has dual solenoids 14, one on the cold water pipe 16 and one on the hot water pipe 18, which provides control of both temperatures of water with one device. The solenoids 14 are connected via wiring 20 to the external control switch, 24, 26, and 28, which is shown in three locations. The water flow regulating device 10 can have multiple configurations. The first configuration is the hip or hand-level switch 24 shown attached to the top front of the cabinet sink 12. The second configuration is a knee-level switch 26 attached towards the bottom front of the cabinet sink 12. The third configuration is a floor-level switch 28 which resides on the top under the overhang of the cabinet sink 12. These configurations could exist in tandem with one another for multiple operating options, or a single control switch could be installed. The wiring 20 is shown attached to an external faucet adapter 30 which provides a switch 32, as seen in FIG. 2, for manual control of water flow from the valve. This could come in handy for precluding the use of the faucet by a child who can reach the other control switches. The wiring 20 is also attached to the electrical system of the house.

FIG. 2 shows the faucet adapter 30 configuration of the water flow regulating device 10 of the present invention. This external faucet adapter 30 could be installed as a unit with the solenoids 14, such that the external switch 32 is the only control switch. The faucet adapter 30 is affixed to the faucet 34 with a screw 36 that is tightened until a secure fitting is accomplished.

Figure 3:
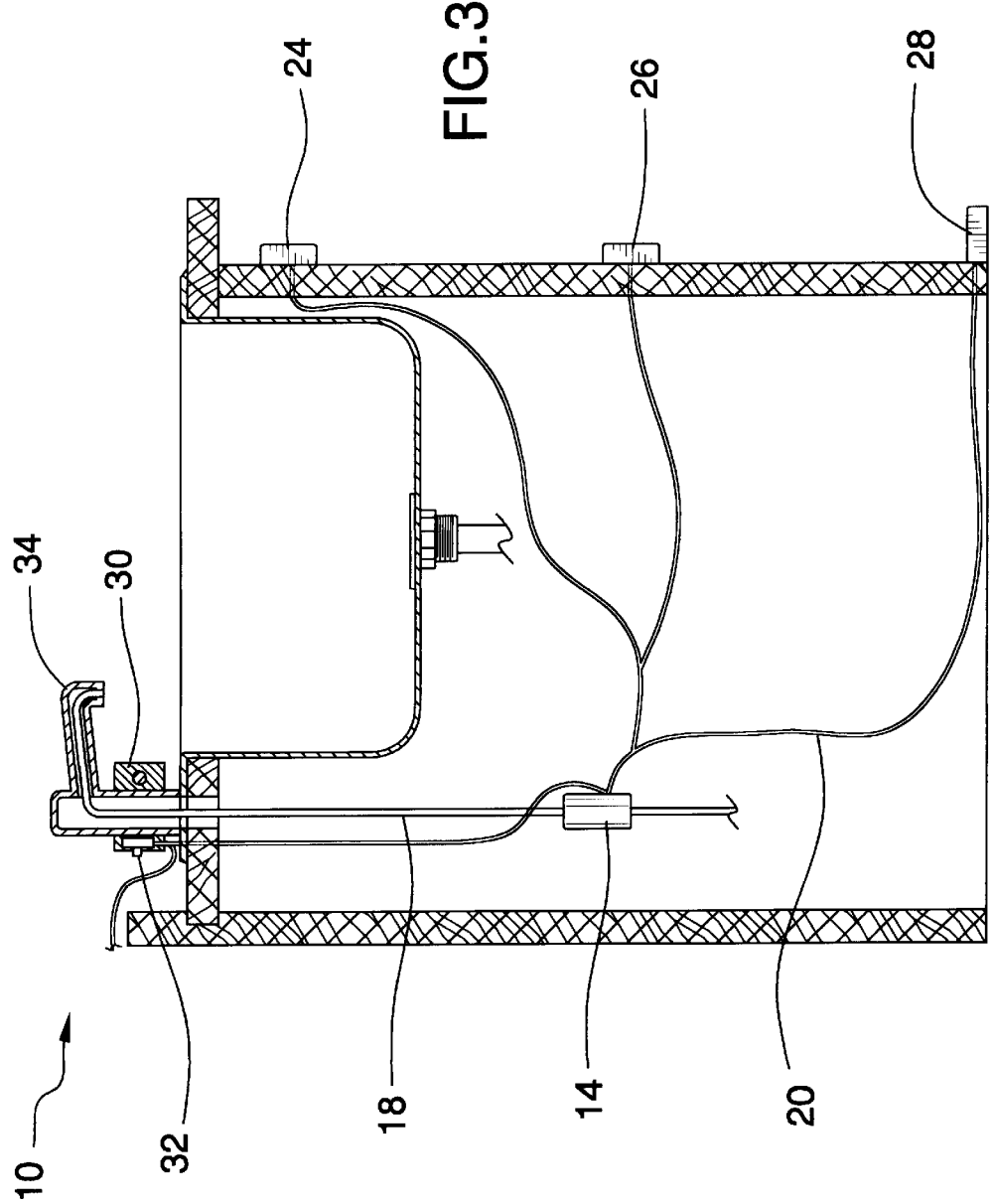
FIG. 3 is a left sectional view of the water flow regulating device of the present invention.

FIG. 3 shows a left sectional view of the water flow regulating device 10 of the present invention. Again, the location of the three cabinet switches, 24, 26, and 28 can be seen. The connections between the wiring 20, the switches, 24, 26, and 28, the solenoid 14, and the faucet adapter 30 is made evident in this view.

Figure 4:
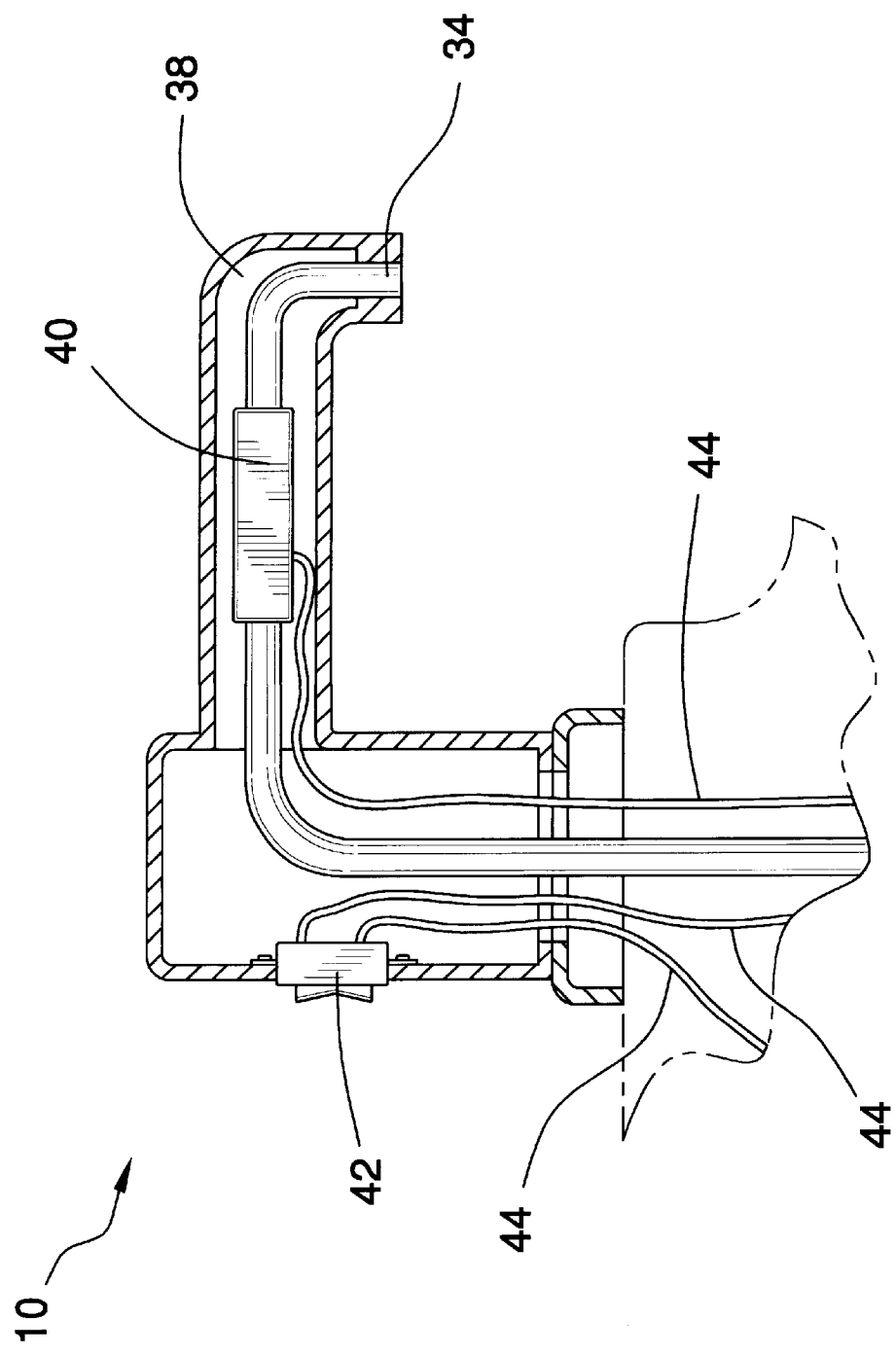
FIG. 4 is a left sectional view of the internal faucet adapter embodiment of the water flow regulating device of the present invention.

FIG. 4 shows a left sectional view of the internal faucet adapter 38 of the water flow regulating device 10 of the present invention. In this configuration, a valve 40 is attached to the interior of a standard faucet 34. This valve is controlled by a rocker switch 42 connected by wiring 44 to the electrical system of the house.

In use, it can now be understood that a number of configurations can be selected for use of the water flow regulating device. For preexisting faucets, several options can be considered. A pair of solenoids is added to the hot and cold water pipes, and control of the solenoids is accomplished by any combination of the following:
- an external faucet adapter attached to the faucet,
- a hip-level switch placed on the front of the fixture in which the sink resides,
- a knee-level switch placed on the front of the fixture in which the sink resides,
- a floor-level switch placed on the floor in front of the fixture in which the sink resides.

Of course, the switches could be placed according to the user's desires.

Several modified faucet configurations are also available for those building a new residence or replacing existing faucets. In the first configuration, a valve and associated wiring would be placed internally in the faucet. The wiring would connect the valve to solenoids on the hot and cold water pipes and also to a switch located on the faucet housing. The second configuration consists of valves attached to the water pipes which are controlled by an external switch located on the faucet housing.

For any of the chosen configurations, the user simply pushes the appropriate control switch and adjusts the water to the desired temperature and pressure. As the user washes dishes, takes a shower, or completes other water-related functions, the flow of water can easily be stopped and restarted without having to readjust the temperature or pressure. Strategically stopping the flow of water can result in significant conservation of water and financial savings.

While a preferred embodiment of the water flow regulating device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, although the present configurations have been presented in relation to a sink, it should be appreciated that the water flow regulating device herein described is also suitable for use in a shower, bathtub, or any other environment where it might be beneficial to regulate the flow of water to a faucet.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A water flow regulating device comprising:
   a coupling device which connects to a faucet;
   a control switch assembly connected to said coupling device for the purpose of permitting and prohibiting the flow of water through the faucet;
   a plurality of electrical wires having two ends and connected on said end to said control switch;
   a plurality of solenoid valve assemblies each connected to a water pipe which feeds the faucet and connected to said opposite end of said wires;
   a power supply connected to said opposite end of said wires, wherein said power supply is the electrical supply in a building "said coupling device comprises a faucet adapter having a rear section shaped like a rectangular block and two arms extending from said block first in a circular direction such that said arms fit around the outer edge of a faucet stem but do not join together and then extending in a direction parallel to one another and formed such that each arm has a threaded transverse hole near the point where said direction of said arm changes from a circular to a straight direction such that said transverse holes exist in parallel planes; a screw connected to said faucet adapter such that it passes through each said transverse hole for the purpose of securing said faucet adapter to said faucet".

\* \* \* \* \*